United States Patent
Harrison

(10) Patent No.: US 9,065,744 B2
(45) Date of Patent: Jun. 23, 2015

(54) PERFORMANCE OPTIMIZED AND CONFIGURABLE STATE BASED HEURISTIC FOR THE CLASSIFICATION OF REAL-TIME TRANSPORT PROTOCOL TRAFFIC

(75) Inventor: David Ronald Harrison, Fremont, CA (US)

(73) Assignee: Netscout Systems, Inc., Westford, MA (US)

( * ) Notice: Subject to any disclaimer, the term of this patent is extended or adjusted under 35 U.S.C. 154(b) by 1010 days.

(21) Appl. No.: 13/164,638

(22) Filed: Jun. 20, 2011

(65) Prior Publication Data

US 2012/0320767 A1  Dec. 20, 2012

(51) Int. Cl.
*H04L 12/26* (2006.01)
*H04L 12/24* (2006.01)

(52) U.S. Cl.
CPC .............. *H04L 43/12* (2013.01); *H04L 41/145* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 6,633,835 B1* | 10/2003 | Moran et al. | 702/190 |
| 6,678,250 B1* | 1/2004 | Grabelsky et al. | 370/241 |
| 8,306,015 B2* | 11/2012 | Guntur | 370/351 |
| 2002/0021700 A1* | 2/2002 | Hata et al. | 370/395.42 |
| 2003/0120789 A1* | 6/2003 | Hepworth et al. | 709/230 |
| 2005/0166123 A1* | 7/2005 | Yanamoto et al. | 714/776 |
| 2006/0212880 A1* | 9/2006 | Underseth et al. | 719/328 |
| 2007/0177520 A1* | 8/2007 | Morinaga et al. | 370/252 |
| 2007/0258372 A1* | 11/2007 | Nadeau et al. | 370/235 |
| 2008/0016498 A1* | 1/2008 | Underseth et al. | 717/124 |
| 2008/0052408 A1* | 2/2008 | Saito et al. | 709/239 |
| 2008/0056302 A1* | 3/2008 | Erdal et al. | 370/474 |
| 2008/0077705 A1* | 3/2008 | Li et al. | 709/236 |
| 2008/0082142 A1* | 4/2008 | Clark et al. | 607/60 |
| 2009/0010259 A1* | 1/2009 | Sirotkin | 370/392 |
| 2009/0135834 A1* | 5/2009 | Guntur | 370/400 |
| 2009/0285210 A1* | 11/2009 | Hsu et al. | 370/389 |
| 2010/0023598 A9* | 1/2010 | Ginter et al. | 709/217 |
| 2010/0275069 A1* | 10/2010 | Lin | 714/48 |
| 2010/0306538 A1* | 12/2010 | Thomas et al. | 713/168 |
| 2010/0329126 A1* | 12/2010 | van Gassel et al. | 370/242 |
| 2011/0222545 A1* | 9/2011 | Eleftheriadis | 370/394 |
| 2012/0144056 A1* | 6/2012 | Stokking et al. | 709/231 |
| 2012/0259583 A1* | 10/2012 | Noboa et al. | 702/179 |

* cited by examiner

*Primary Examiner* — Ayaz Sheikh
*Assistant Examiner* — Faiyazkhan Ghafoerkhan
(74) *Attorney, Agent, or Firm* — Fenwick & West LLP

(57) ABSTRACT

A probe receives a first packet over a network on a port. A sequence number and synchronization source identifier (SSRC) associated with the first packet are identified. The probe receives a subsequent packet and a sequence number and SSRC associated with the subsequent packet are determined. The probe determines whether the SSRC associated with first packet and the SSRC associated with the subsequent packet match. Additionally, the probe determines whether the sequence number associated with the subsequent packet is within an acceptable range of values related to the sequence number associated with the first packet. Additionally, the probe calculates the time interval between reception of the packets. The probe classifies traffic on the port as RTP or non-RTP traffic based on analysis of the SSRCs, sequence numbers and time intervals.

20 Claims, 3 Drawing Sheets

PERFORMANCE OPTIMIZED AND CONFIGURABLE STATE BASED HEURISTIC FOR THE CLASSIFICATION OF REAL-TIME TRANSPORT PROTOCOL TRAFFIC

FIELD OF THE INVENTION

The invention relates generally to computer network and application monitoring. More specifically, the invention relates to classification of real-time transport protocol traffic.

BACKGROUND OF THE INVENTION

As internet protocol (IP) based networks continue to evolve, an increasing amount of voice and video media traffic is transported. An important functionality of these networks is the transmission of audio and video data using the Real Time Transport (RTP) protocol. RTP is connectionless User Datagram Protocol (UDP) based, and lacks some of the performance management capabilities of connection oriented Transmission Control Protocol (TCP). Without the performance management provided by TCP, UDP traffic is vulnerable to network anomalies making accurate classification of RTP difficult.

Interruption to RTP transmissions can cause impairments detrimental to a user's experience. Data quality measurement and fault analysis rely substantially on accurate classification of RTP. This is made difficult by several characteristics of RTP traffic. First, a large number of ports capable of utilizing RTP may also be used my other applications and transport protocols. Additionally, anomalies in RTP traffic, such as dropped and out of sequence packets, make it difficult for a classification algorithm to correctly identify RTP traffic.

SUMMARY OF THE INVENTION

The present invention is a traffic classification method which dynamically evaluates traffic at a port to determine whether the traffic on the port is RTP. In one embodiment, the method includes making preliminary checks such as the UDP port being analyzed is even and the RTP version field is set to 2. Subsequently, the RTP SSRC is analyzed to determine whether it remains constant for all packets processed. Each direction of RTP traffic at a port has its own RTP SSRC for all packets transmitted in a certain direction. The RTP sequence number of a packet is compared with previous packets in the RTP stream. While the sequence number should predictably increment, some variance may be acceptable to accommodate packets received out of order. Certain known RTP ports, based on situational information, may be more likely to be classified as transmitting an RTP stream. In one embodiment, the header length and payload length, based on payload type, are analyzed to assess whether the packet conforms with characteristics typical of that payload type. Lastly, interframe time, or time between packets in a stream, may be used to verify that the stream conforms with feasible RTP interframe durations.

In one embodiment, the classification algorithm may be configured, by a user or otherwise, to adjust certain parameters. Broadly, the heuristic may be turned on or off. If it is known that all traffic is RTP, the heuristic may be turned off altogether to avoid unnecessary analysis. In one embodiment, the number of samples analyzed before classifying a stream is adjustable. The duration of time between packets may be defined that is acceptable for RTP traffic. Additionally, the range of payload lengths associated with a certain payload type may be configurable. Lastly, the number of duplicate packets or range of out of sequence packets accepted before classifying a stream as non-RTP traffic may be configurable. Testing of the disclosed classification method resulted in improved accuracy of RTP classification by as much as 25 percent or more.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Figure 1:
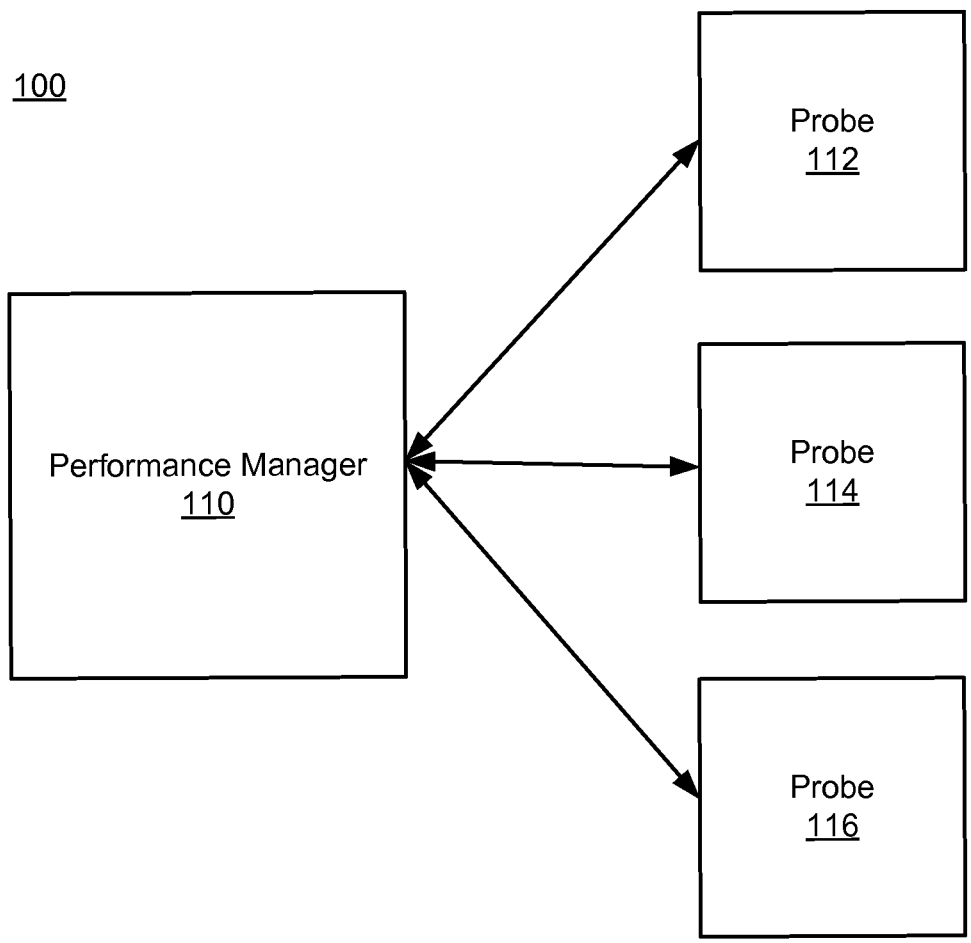
FIG. 1 is an illustration of an overview of a performance analysis system including a performance manager and probes.

FIG. 1 is an illustration of an overview of a performance analysis system 100 including a performance manager 110 and probes 112, 114 and 116. In one embodiment, performance manager 110 manages one or more probes that interface with a network. This enables the performance manager 110 to receive data from, control, or otherwise manage probes that are connected. For example, in one embodiment, performance manager 110 configures heuristic parameters at the probe 112 and collects statistics on RTP traffic analyzed by the probe 112. Alternatively, configuration can be performed at the probe through various methods well known in the art including a command line interface. In one embodiment, probes are configured to perform a variety of functions. For example, some probes may be configured to determine whether or not traffic is RTP traffic, while other probes may analyze various other network characteristics. RTP probes may be placed anywhere in a network where network traffic may contain RTP streams. As RTP traffic may degrade during transmission, it can be beneficial to place multiple probes along a network path to assess stream degradation.

Figure 2:
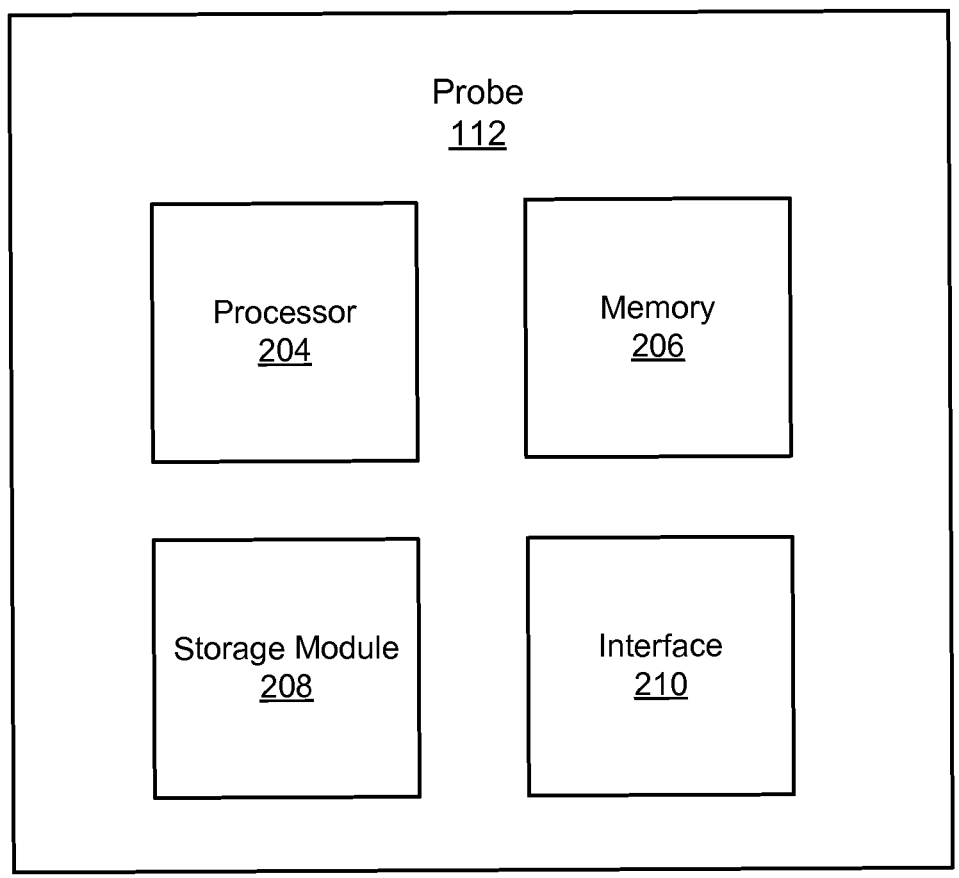
FIG. 2 is an illustration of a block diagram of a probe for performing the disclosed heuristic and classifying traffic, in accordance with one embodiment of the present invention.

FIG. 2 is an illustration of a block diagram of a probe 112 for performing the disclosed heuristic and classifying traffic, in accordance with one embodiment of the present invention. Probe 112 may include, among other components, a processor 204, memory 206, a storage module 208, and an interface 210, e.g., an interface for communicating with external systems and/or networks, for example. Applications are executed using processor 204 and can be received via the interface 210, stored in memory 206, stored in a storage device 208 or by using a combination of these elements. In other embodiments, other conventional ways to store and update applications are used. For ease of discussion, in the embodiment illustrated in FIG. 2 applications are stored in the storage device 208. The probe 112 may also include other components such as user input devices (e.g., keyboard and mouse) and display devices (e.g., a display driver card).

The processor 204 executes computer instructions stored in the memory 206 and/or the storage module 208. Although only a single processor is illustrated in FIG. 2, two or more processors may be used to increase the computing capacity and the processing speed of the probe 112.

The memory 206 is a computer readable storage medium that stores, among other data, computer instruction modules for processing, storing and/or retrieving the network data. In one embodiment, the memory 206 is a primary storage device (e.g., Random-Access Memory (RAM)) having a faster access speed compared to the storage module 208. In an embodiment, the probe 112 is able to capture data from the network via the interface 210 transparently. That is, without significantly affecting the communication between devices on either end of a communication path.

The storage module 208 may be a secondary storage device for storing, among others, the raw or processed network data. The storage module 208 may be embodied, for example, as a solid-state drive, hard disk or other memory devices capable of storing a large amount of data compared to the memory 206. In one embodiment, the network data received at the probe 112 are stored and then deleted on a first-in-first-out (FIFO) basis.

The interface 210 may include a NIC (network interface card) or other standard network interfaces to receive network data, and to communicate with other network interface devices coupled to a network, such as performance manager 110. For example, the interface 210 may be an Ethernet interface, a WiFi (IEEE 802.11) interface, or other types of wired or wireless network interfaces. In one embodiment, two or more network interfaces may be used to communicate with different types of networks or perform specialized functions. For example, one network interface may be used to communicate with the performance manager 110 and one network interface may be used to collect data for analysis.

The components of the probe 112 of FIG. 2 are merely illustrative. In alternative embodiments, the storage module 208, for example, may be omitted. In this embodiment, all the information is stored in the memory 206.

Figure 3:
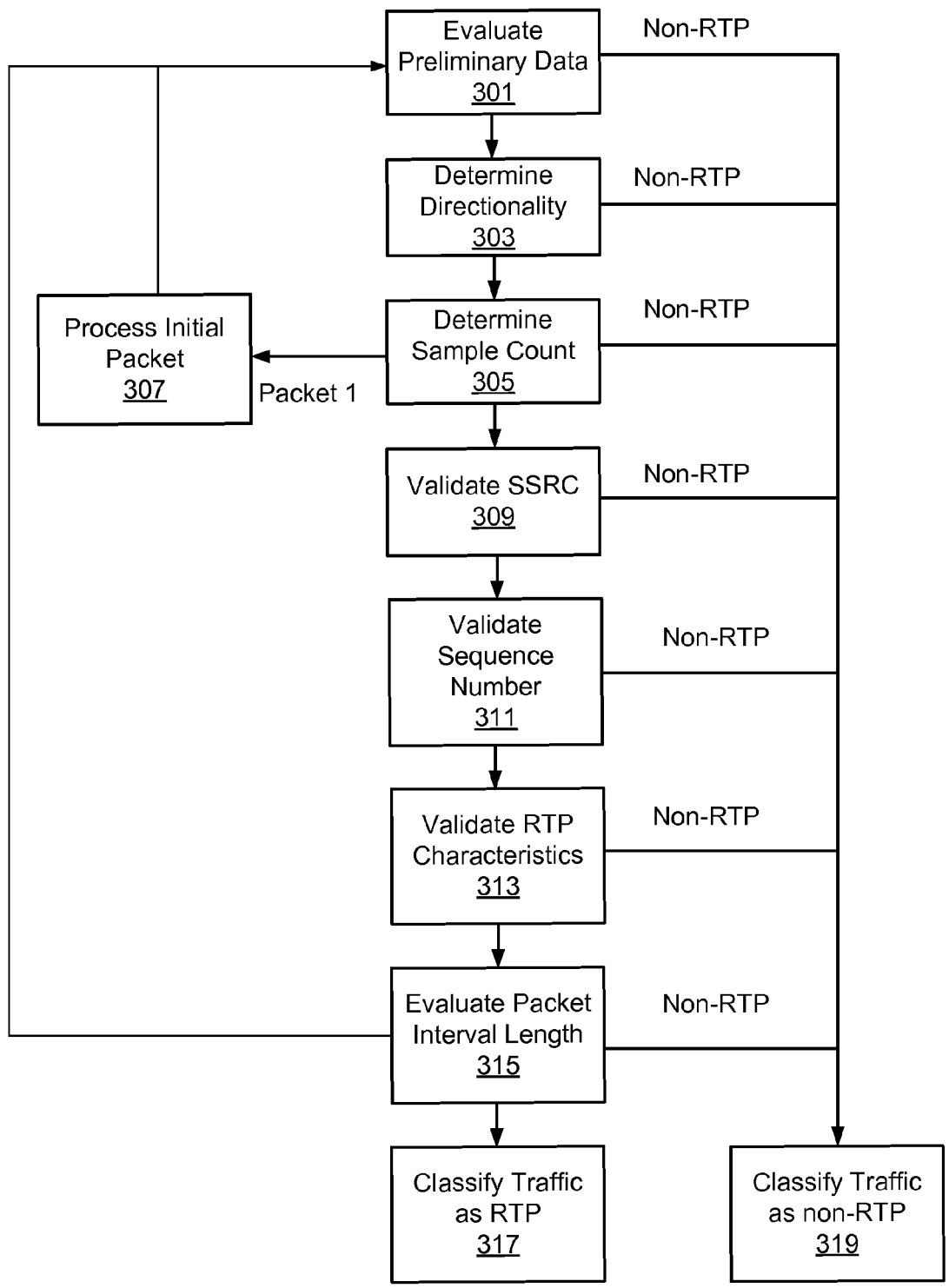
FIG. 3 is an illustration of a flow chart for performing the disclosed heuristic in accordance with one embodiment of the present invention.

FIG. 3 is an illustration of a flow chart for performing the disclosed heuristic in accordance with one embodiment of the present invention. The flow illustrates the steps performed by the probe 112, or other probes communicatively coupled to the performance manager 110, in the analysis of one or more packets in one embodiment. The steps are repeated to analyze a plurality of packets in a stream of traffic. In one embodiment, the heuristic may be turned off completely and no network traffic is classified. If the heuristic is on, preliminary data is evaluated 301 to assess, at a high level, whether the packet may be RTP traffic. Generally, it is confirmed that the RTP version contains a valid value such as 2. In addition, it is verified that the traffic is on an even numbered port, which are used to transmit UDP traffic such as RTP. In one embodiment, if a packet fails this initial test, or any later test, the traffic may be classified 319 as non-RTP traffic. In one embodiment, a certain number of samples, or packets, in a stream must fail a test before the associated stream is classified as non-RTP traffic. In one embodiment, to classify a stream as RTP traffic, all packets associated with the stream must be validated as RTP traffic until a maximum number of samples have been analyzed.

If the packet passes the preliminary evaluation, the directionality of the stream is determined 303. For example, it is determined whether the transmission is from a server to a client, or from a client to a server. This information is used to validate the consistency of RTP traffic since certain RTP header values, such as sequence number and synchronization source identifier (SSRC) are unique to each direction of an RTP stream. Subsequently, the probe 112 determines 305 the sample count for the stream in that direction on a given port. If the current packet is the first sample to be analyzed, probe 112 processes 307 and stores initial packet information. This initial packet information may include sequence number and SSRC. In addition, the packet count, or number of samples analyzed for the stream in the same direction, is incremented. After storing initial packet information, probe 112 evaluates preliminary data associated with the next packet to be analyzed. In one embodiment, the number of samples analyzed before classifying validated traffic as RTP is configurable. In one embodiment, this and other configurable preferences are stored in the storage module 208 of the probe 112. Configurable values may be configured by interaction with the probe 112 using direct input including a keyboard or mouse. In addition, configurable values may be set and altered by software or via network communication over the interface 210 of the probe 112. In addition, the number of samples analyzed before classifying traffic as RTP may be automatically adjusted at runtime according to how many duplicate or out of sequence packets are received and analyzed. After processing this initial packet information, probe 112 receives the next packet for analysis and begins again by evaluating 301 preliminary data.

If the analyzed packet is not the first sample to be analyzed, the probe 112 validates 309 the SSRC in the RTP header. However, in one embodiment, after a maximum number of samples have been evaluated, probe 112 ceases analysis of a traffic stream. The SSRC of the current packet is compared with that of the initial packet of the stream in the same direction. If the SSRCs do not match, the stream is classified as non-RTP traffic. If the SSRCs do match, the probe 112 validates 331 the sequence number of the current packet. Typically, the RTP sequence number should increment for each packet transmitted in a stream in each direction. To validate 311 this, the sequence number of the current packet may be compared to the sequence number of the previous packet, or to the sequence number of the initial packet plus the packet count or number of samples that have been analyzed in the stream. In one embodiment, a range of sequence numbers is accepted as valid. This accounts for RTP packets that are received out of order or duplicate RTP packets. In one embodiment, the current packet sequence number must be within two of the expected packet sequence number. The range of accepted values does not need to be symmetrical. For example, current packet sequence number may be as much as two above or three below the expected packet sequence number. In one embodiment, the range of accepted sequence numbers is configurable by a user. If the current packet sequence number is outside of the accepted range, the stream associated with the current packet is classified as non-RTP traffic. In one embodiment, duplicate packets, or those with identical sequence numbers are accepted as valid RTP packets. In one embodiment, the number of duplicate packets accepted before classifying the traffic as non-RTP traffic may be user configurable. Otherwise, probe 112 continues on to analyze additional packet information.

Next, probe 112 validates 313 certain RTP characteristics. First, the port on which the data is being transmitted is analyzed. Certain ports may be classified as carrying a specific type of traffic. For example, a port may be known to carry FTP traffic. Therefore, traffic on the port must be classified as non-RTP traffic. Additionally, an administrator may know that a certain port, or range of ports, carries RTP traffic and configure the probe to automatically classify traffic on that port as RTP. The probe 112 may store this information, causing probe 112 to validate a packet on the port as RTP traffic. These known ports may be based on technical specifications or on local information manually designated or configured by a network administrator or other user. Additionally, probe 112 validates the payload length of the current packet based on a payload type. The payload type is typically defined in the RTP header. Based on the payload type, probe 112 can determine size constraints of the payload of the current packet. In one embodiment, static default lengths associated with a payload type are used to validate current packet payload length. Alternatively, the payload lengths associated with one or more payload types may be configured in accordance with a user's preference. In addition, another general payload length range may be used for all RTP payloads. In one embodiment, the user selects whether default payload lengths, customized payload lengths by payload type, or a general customized payload length is used to determine if the current packet payload falls within an acceptable range. For example, a user may configure probe 112 to use customized payload lengths for a subset of payload types. For other payload types, the user can configure the probe to use the static default payload length ranges, or a general payload length range for payload types that have not been specifically customized.

If the packet is found to be in accordance with acceptable RTP characteristics, the probe 112 evaluates 315 packet interval length. For the purposes of this application, packet interval length is defined as the length of time between reception of packets. To accomplish this, probe 112 determines and stores the time that has passed between receiving the previous packet and the current packet. If the time between packets exceeds or falls below certain limits, the traffic is classified as non-RTP. For example, a default configuration may specify that traffic is classified as non-RTP if more than 500 milliseconds pass between receiving packets. In one embodiment, the range of acceptable packet interval times is configurable by a user. In addition, the range of acceptable packet interval times may depend on the payload type of the RTP traffic. Hence, a user can configure acceptable packet interval times for specific packet types. If the specified maximum number of samples have been analyzed and validated, probe 112 classifies 317 the traffic as RTP traffic. If the traffic has been validated as RTP, but additional packets will be analyzed, probe 112 evaluates 301 preliminary data of the next received packet.

In addition to the validations described above, various other aspects of received packets may be analyzed. For example, in one embodiment, it may be verified that the header length of the packet is greater than 10. In one embodiment, additional heuristic parameters may be configured by a user.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the present invention is not described with reference to any particular programming language. It will be appreciated that a variety of programming languages may be used to implement the teachings of the present invention as described herein, and any references herein to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for classifying network traffic, the method comprising:
    receiving a first packet of network traffic on a port;
    determining a synchronization source identifier (SSRC) associated with the first packet and a first sequence number associated with the first packet;
    receiving a subsequent packet of network traffic on the port;
    determining a synchronization source identifier (SSRC) and a second sequence number associated with the subsequent packet;
    determining whether the SSRC associated with the subsequent packet matches the SSRC associated with the first packet;
    determining whether the second sequence number associated with the subsequent packet is within a range of sequence number values, the range defined by (1) a first value greater than the first sequence number and (2) a second value less than the first sequence number, wherein a first difference between the first sequence number and the first value and a second difference between the first sequence number the second value are not equal;
    calculating an interval time between reception of the first packet and reception of the subsequent packet;
    determining whether the interval time is within a range of time values; and
    classifying traffic on the port based on whether the SSRC associated with the first packet matches the SSRC associated with the subsequent packet, the second sequence number associated with the subsequent packet is within the range of sequence number values, and the interval time is within the range of time values.

2. The method of claim 1, wherein classifying traffic on the port comprises classifying traffic as Real-Time Transport Protocol (RTP) traffic or non-RTP traffic.

3. The method of claim 1, wherein the acceptable range of time values is user configurable.

4. The method of claim 1, further comprising:
    determining a directionality of the first packet and a plurality of subsequent packets; and
    verifying that the directionality of the first packet matches the directionality of the plurality of subsequent packets.

5. The method of claim 1, further comprising:
    determining whether the subsequent packet exceeds a maximum number of packets to be analyzed.

6. The method of claim 1, further comprising:
    determining a payload type of the subsequent packet; and
    determining whether a payload length of the subsequent packet is within a range of payload length values associated with the payload type.

7. The method of claim 1, further comprising:
    responsive to determining that the second sequence number associated with the subsequent packet is outside of the range of sequence number values, increasing a number of samples to be analyzed prior to classifying traffic on the port.

8. A computer program product for classifying network traffic, the computer program product comprising a non-transitory computer-readable storage medium storing instructions that when executed cause at least one processor to:
    receive a first packet of network traffic on a port;
    determine a synchronization source identifier (SSRC) associated with the first packet and a first sequence number associated with the first packet;
    receive a subsequent packet of network traffic on the port;
    determine a synchronization source identifier (SSRC) and a second sequence number associated with the subsequent packet;
    determine whether the SSRC associated with the subsequent packet matches the SSRC associated with the first packet;
    determine whether the second sequence number associated with the subsequent packet is within a range of sequence number values, the range defined by (1) a first value greater than the first sequence number and (2) a second value less than the first sequence number, wherein a first difference between the first sequence number and the first value and a second difference between the first sequence number the second value are not equal;
    calculate an interval time between reception of the first packet and reception of the subsequent packet;
    determine whether the interval time is within a range of time values; and
    classify traffic on the port based on whether the SSRC associated with the first packet matches the SSRC associated with the subsequent packet, the second sequence number associated with the subsequent packet is within the range of sequence number values, and the interval time is within the range of time values.

9. The computer program product of claim 8, wherein classifying traffic on the port comprises classifying traffic as Real-Time Transport Protocol (RTP) traffic or non-RTP traffic.

10. The computer program product of claim 8, wherein a range of ports is automatically classified based on a configured preference.

11. The computer program product of claim 8, further comprising:
    determine a directionality of the first packet and a plurality of subsequent packets; and
    verify that the directionality of the first packet matches the directionality of the plurality of subsequent packets.

12. The computer program product of claim 8, further comprising:
    determine whether the subsequent packet exceeds a maximum number of packets to be analyzed.

13. The computer program product of claim 8, further comprising:
    determine a payload type of the subsequent packet; and
    determine whether a payload length of the subsequent packet is within a range of payload length values associated with the payload type.

14. The computer program product of claim 8, further comprising:
    responsive to determining that the second sequence number associated with the subsequent packet is outside of the range of sequence number values, increasing a number of samples to be analyzed prior to classifying traffic on the port.

15. A system for classifying network traffic, comprising:
    a non-transitory computer-readable storage medium storing executable computer program instructions comprising instructions for:
    receiving a first packet of network traffic on a port;
    determining a synchronization source identifier (SSRC) associated with the first packet and a first sequence number associated with the first packet;
    receiving a subsequent packet of network traffic on the port;
    determining a synchronization source identifier (SSRC) and a second sequence number associated with the subsequent packet;
    determining whether the SSRC associated with the subsequent packet matches the SSRC associated with the first packet;
    determining whether the second sequence number associated with the subsequent packet is within a range of sequence number, the range defined by (1) a first value greater than the first sequence number and (2) a second value less than the first sequence number, wherein a first difference between the first sequence number and the first value and a second difference between the first sequence number the second value are not equal;
    calculating an interval time between reception of the first packet and reception of the subsequent packet;
    determining whether the interval time is within a range of time values; and
    classifying traffic on the port based on whether the SSRC associated with the first packet matches the SSRC associated with the subsequent packet, the second sequence number associated with the subsequent packet is within the range of sequence number values, and the interval time is within the range of time values; and
    a processor for executing the computer program instructions.

16. The system of claim 15, wherein classifying traffic on the port comprises classifying traffic as Real-Time Transport Protocol (RTP) traffic or non-RTP traffic.

17. The system of claim 15, wherein the acceptable range of time values is user configurable.

18. The system of claim 15, further comprising instructions for:
    determining a directionality of the first packet and a plurality of subsequent packets; and
    verifying that the directionality of the first packet matches the directionality of the plurality of subsequent packets.

19. The system of claim 15, further comprising instructions for:
    determining whether the subsequent packet exceeds a maximum number of packets to be analyzed.

20. The system of claim 15, further comprising:
    responsive to determining that the second sequence number associated with the subsequent packet is outside of the range of sequence number values, increasing a number of samples to be analyzed prior to classifying traffic on the port.

* * * * *